United States Patent Office 3,294,708
Patented Dec. 27, 1966

3,294,708
METHOD OF PREPARING POLYMERIC HETEROCYCLIC AMIDES
Leo P. Parts and Morris L. Nielsen, Dayton, Ohio, and Robert Z. Greenley, St. Louis, Mo., assignors to Monsanto Research Corporation, St. Louis, Mo., a corporation of Delaware
No Drawing. Filed Dec. 24, 1963, Ser. No. 333,173
9 Claims. (Cl. 260—2)

This invention relates to phosphorus-containing solid, resinous polymers having a 5,5'-bibenzimidazole linkage and more particularly provides a new and valuable method for the preparation of such polymers and a new reactant employed in said method.

The 5,5'-bibenzimidazoles are described in the copending application of R. Z. Greenley and M. L. Nielsen, Serial No. 169,676, filed January 29, 1962, now U.S. Patent 3,173,886. They are prepared by the reaction of an appropriate biphenyltetramine with a carboxylic acid, substantially according to the scheme:

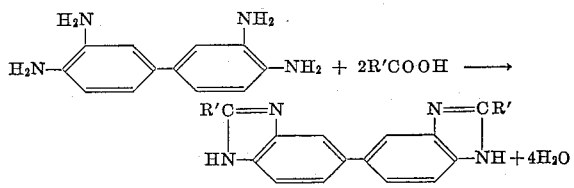

where R' is selected from the class consisting of hydrogen and alkyl radicals of from 1 to 5 carbon atoms. When the carboxylic acid is formic acid, the product is 5,5'-bibenzimidazole. When it is an alkanecarboxylic acid, the product is a 2,2'-dialkyl-5,5'-bibenzimidazole, e.g., reaction of the 3,3',4,4'-biphenyltetramine, depicted above, with acetic acid yields 2,2'-dimethyl-5,5'-bibenzimidazole, and when instead of acetic acid there is employed a higher acid, e.g., valeric acid or hexanoic acid, the product is 2,2'-dibutyl- or 2,2'-dipentyl-5,5'-bibenzimidazole.

As disclosed in said Greenley and Nielsen patent 5,5'-bibenzimidazole or said 2,2'-dialkyl-5,5'-bibenzimidazoles condense with aromatic phosphonic dihalides to give valuable polymeric materials having the repeating unit

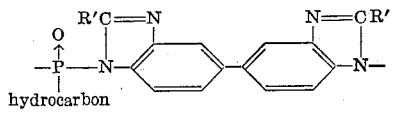

In the condensation reaction, two moles of hydrogen halide are evolved and react with whatever base is available. In order to avoid depletion of the basic-reacting bibenzimidazole, an extraneous basic agent is generally employed as hydrogen halide scavenger. Use of an inorganic base is usually impracticable because the water which is required to dissolve such a base will hydrolyze the phosphonic dihalide reactant. The use of an extraneous, organic base results in the formation of by-product amine hydrochlorides which are removed with difficulty from the reaction mixture.

Now we have found that polymers consisting essentially of the above depicted repeating unit are readily obtained without encountering the difficulties entailed by using for their preparation a reaction which involves evolution of hydrogen halide. According to the present invention, said polymers are readily prepared by reaction of a diimidazol-1-ylhydrocarbylphosphine oxide or a dipyrrol-1-ylhydrocarbylphosphine oxide with the 5,5'-bibenzimidazole compound. The reaction proceeds with evolution of imidazole or of pyrrole, substantially according to the scheme:

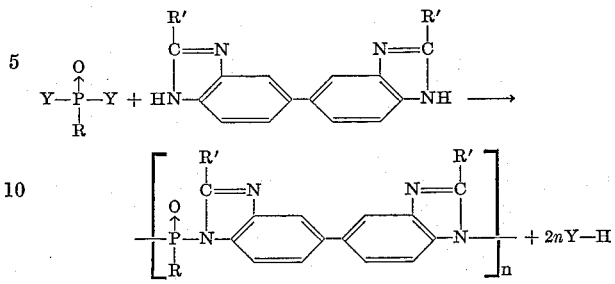

where Y is selected from the class consisting of the imidazol-1-yl and the pyrrol-1-yl radicals with Y-H denoting the addition of hydrogen at the 1-position, R is an aromatic hydrocarbon radical of from 6 to 12 carbon atoms which is free of olefinic and acetylenic unsaturation and is linked through nuclear carbon to the remainder of the molecule, R' is selected from the class consisting of hydrogen and alkyl radicals of from 1 to 5 carbon atoms, and $n$ denotes the degree of polymerization.

Reaction of the 5,5'-bibenzimidazole compound with a diimidazol-1-ylarylphosphine oxide to obtain a solid polymeric product proceeds as follows:

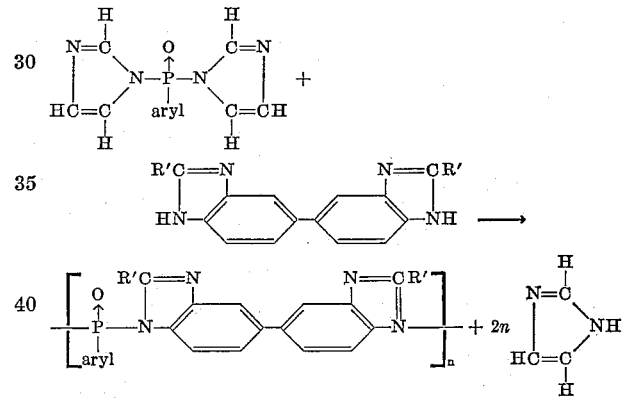

wherein aryl denotes the above-defined aromatic hydrocarbon radical.

It proceeds in the same manner with dipyrrol-1-ylphenylphosphine oxide, thus:

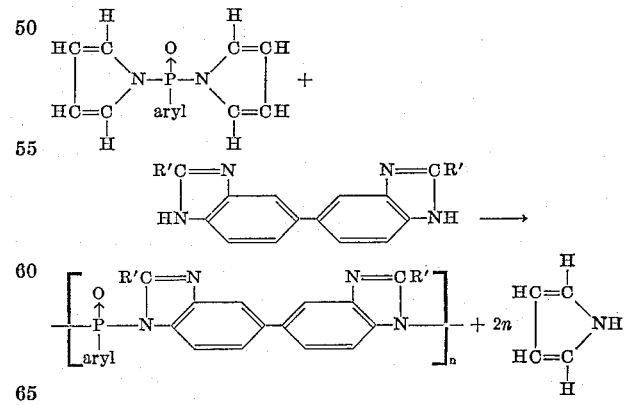

Examples of presently useful diimidazol-1-ylhydrocarbylphosphine oxides or dipyrrol-1-ylhydrocarbylphosphine oxides include those in which the hydrocarbyl radical contains an aromatic nucleus, is linked through nuclear carbon to the remainder of the molecule, is free of olefinic and acetylenic unsaturation and contains as many as 12 carbon atoms, e.g., diimidazol-1-ylphenylphosphine oxide, dipyrrol-1-yl-o-(m-or p)-tolylphosphine oxide, dipyrrol-1-yl-α-naphthylphosphine oxide, diimidazol-1-yl-α-methyl-β-naphthylphosphine oxide, dipyrrol-1-yl- or diimidazol-1-yl-biphenylylphosphine oxide, diimidazol-1-yl- or dipyrrol-1-ylbenzylphosphine oxide, diimidazol-1-yl-(o-, m- or p-hexylphenyl)phosphine oxide, dipyrrol-1-yl(pentamethylphenyl)phosphine oxide, diimidazol-1-yl-(o-, m- or p-cyclohexylphenyl)phosphine oxide, etc.

The diimidazol-1-ylhydrocarbylphosphine oxides are obtained by reaction of an aromatic hydrocarbylphosphonic dihalide with imidazole as described in the copending application of R. Z. Greenley and M. L. Nielsen, Serial No. 294,179, filed July 10, 1963 now U.S. Patent 3,227,727, or by the reaction of an imidazol-1-ylmetal compound, e.g., imidazol-1-ylpotassium, with a hydrocarbylphosphonic dihalide, as described in the copending application of L. P. Parts, Serial No. 326,226, filed November 26, 1963 now U.S. Patent 3,227,728. The dipyrrol-1-ylhydrocarbylphosphine oxides are prepared by the reaction of a pyrrol-1-yl alkali or alkaline earth metal compound with an appropriate hydrocarbylphosphonic dihalide. For example, with an alkali metal compound the reaction takes place substantially according to the scheme:

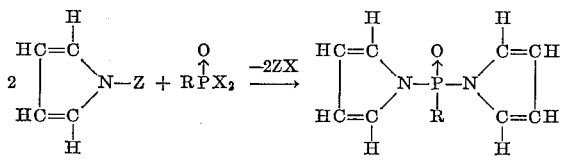

wherein Z is selected from the class consisting of alkali and alkaline earth metals, R is a benzenoid hydrocarbon radical which is free of olefinic and acetylenic unsaturation, contains from 6 to 12 carbon atoms and is linked through nuclear carbon to the remainder of the molecule, and X is halogen having an atomic weight of at least 35.

The reaction may be conducted in the presence or absence of an inert organic liquid diluent or solvent, e.g., xylene, kerosene, dioxane, an alkylene glycol diether, diglyme, dimethylsulfoxide, etc. Generally the reaction is exothermic; hence, no extraneous heating need be applied. However, to assure completion of the reaction within the minimum time heating up to reflux may be employed.

The starting pyrrol-1-ylmetal for the above reaction may be pyrrol-1-ylsodium, pyrrol-1-ylpotassium, pyrrol-1-yllithium, pyrrol-1-ylrubidium, dipyrrol-1-ylcalcium, dipyrrol-1-ylbarium, dipyrrol-1-ylmagnesium, etc. Useful hydrocarbylphosphonic dihalides include phenylphosphonic dichloride or dibromide, o-, m- or p-tolylphosphonic dichloride or diiodide, xylylphosphonic dichloride or diiodide, α- or β-naphthylphosphonic dibromide or diiodide, o-, m- or p-biphenylylphosphonic dichloride or dibromide, 3-acenaphthenylphosphonic dichloride or diiodide, 1-fluorenylphosphonic dichloride or dibromide, o-, m- or p-cyclopentylphenylphosphonic dichloride or diiodide, o-, m- or p-hexylphenylphosphonic dichloride or dibromide, etc.

Reaction of 5,5'-bibenzimidazole or of a 2,2'-dialkyl-5,5'-bibenzimidazole with the diimidazol-1-yl- or dipyrrol-1-ylhydrocarbylphosphine oxide takes place with production of the desired bibenzimidazole polymer and formation of imidazole or of pyrrole as by-product. The by-product can be used for making a new supply of the phosphine oxide or phosphine amide reactant.

Preparation of the polymer, according to the invention, takes place by simply heating the phosphine oxide with the 5,5'-bibenzimidazole compound at temperatures of from, say, 100° C. to 400° C., at ordinary, decreased or increased pressure and in the presence or absence of a liquid diluent or solvent. The reaction takes place readily in the absence of a catalyst; however, a catalyst, preferably basic, may be employed. The nature of solvent or diluent will depend upon the specific reactants which are used as well as upon the temperature and pressure conditions. Virtually any organic liquid which is inert under the reaction conditions may be used as diluent; and as will be obvious to those skilled in the art, a low-boiling diluent generally will not be employed when the process is conducted at high temperatures or under substantially decreased pressure. Examples of useful diluents are dioxane, tetrahydrofuran, benzene, xylene, nitrobenzene, dimethylsulfoxide, dimethylformamide, 1,2-dimethoxyethane, diglyme, quinoline, 1-methyl-2-pyrrolidinone, etc. The use of a solvent will depend to some extent upon the nature of the reactants as well as upon the extent of heating. When the reactants melt readily at the contemplated reaction temperature, a diluent need not be used unless the phosphine oxide is extremely reactive. In that case, the use of an inert diluent will serve to moderate the reaction. With high-melting reactants, the use of a solvent permits conducting the polymerization reaction at temperatures which may be significantly lower than the temperatures at which the reactants melt. With respect to the temperature at which reaction is effected, there must be taken into consideration the nature of the reactants, whether or not a catalyst and/or diluent is used and the pressure at which the reaction is conducted. In some cases the polymerization may be conducted by warming, say, at temperatures of from 100° C. to 200° C. at ordinary atmospheric pressure. In other instances, heating of the reaction mixture at higher temperatures, say, at temperatures of from 200° C. to 400° C., and preferably at from 220° C. to 280° C., will be found to give optimum conversion. Operating in an inert atmosphere, e.g., nitrogen or argon, may be desirable, but not necessary. All of these variables, i.e., use of and nature of diluent, inert atmosphere, catalyst, temperature and pressure, can readily be arrived at by easy experimentation. Since reaction is evidenced by a change in viscosity, the extent of such change will be indicative of reaction. Very rapid reaction, as evidenced by rapid viscosity change will show the need for a diluent and/or lower temperature and/or shorter heating and/or no catalyst if one has been employed. Conversely, no reaction or only a very slow reaction will indicate the use of more extreme conditions. Thus, arrival at optimum reaction conditions is simply a matter of routine procedure by one skilled in the art. To assure complete reaction in experimental runs, it is generally recommended that the temperature of the reaction mixture be increased after the primary reaction has subsided. Completion of the reaction can then be ascertained by simply noting cessation in change of viscosity.

When the polymerization has been effected in the absence of a solvent or diluent and the reactants are employed in the stoichiometric proportions, the polymer is generally recovered from the reaction mixture by simply providing for volatilization of the imidazole or pyrrole either during or after the polymerization reaction is completed. Analogously, when a solvent is employed, both the solvent and the by-product can be removed by distillation or sublimation. The polymer may also be obtained from the reaction mixture by precipitating it from a non-solvent, whereby the by-product imidazole or pyrrole remains in solution. When the reaction is effected in the presence of a diluent which is a non-solvent for the polymer, the precipitated polymer is simply filtered off, washed and dried. When the reaction is conducted in a liquid which is a solvent for the polymer, the latter is separated from the reaction mixture by mixing with a liquid which is a non-solvent for the polymer. The by-product imidazole or pyrrole is generally much more soluble than the bibenzimidazole polymer; this fact permits easy removal by washing.

To recapitulate: In the preparation of the phosphorus-containing, 5,5'-bibenzimidazole polymers, a diimidazol- 1-ylarylphosphine oxide or a dipyrrol-1-ylarylphosphine oxide or a mixture of the same is reacted with the bibenzimidazole compound in the presence or absence of an inert diluent or solvent and in the presence or absence of catalyst at a temperature which may be as low as, say, 100° C. and as high as, say, 400° C., at ordinary, increased or decreased pressure. The phosphine oxide and the 5,5'-bibenzimidazole compound are employed in substantially stoichiometric proportions; however, a very slight excess of the bibenzimidazole may be employed, since unreacted material is readily separated from the polymer product. There may be used a mixture of both phosphine oxides, i.e., a mixture of the diimidazol-1-yl- and dipyrrol-1-ylarylphosphine oxides. Likewise, there may be used a mixture of two or more different diimidazol-1-yl compounds or two or more different pyrrol-1-yl compounds in any proportion, say, a 2:1 mixture of diimidazol-1-ylphenylphosphine oxide and diimidazol-1-yl-o-tolylphosphine oxide; or there may be used a mixture of bibenzimidazoles, say, a 1:1 mixture of 5,5'-bibenzimidazole and 2,2'-diethyl-5,5'-bibenzimidazole to obtain polymers having various linkages dispersed more or less randomly in the polymer chain.

The presently prepared linear polymers range from waxy to high-melting solids. Of particular importance, however, are those of the presently prepared linear polymers which are solid, resinous materials. Such products are readily compression molded with heating to give molded objects which are tough, transparent and of good dimensional stability. The polymers may also be cast into films from solutions thereof or fibers may be prepared therefrom by extruding the polymers through a suitable orifice into a precipitating bath. Solutions of the solid polymers are useful as impregnating agents and adhesives in the manufacture of laminates, resin base coatings, i.e., paints, varnishes, lacquers and enamels.

The invention is further illustrated by, but not limited to, the following examples.

EXAMPLE 1

5,5'-bibenzimidazole was prepared as follows: A mixture consisting of 7.0 g. (0.02 mole) of 3,3',4,4'-biphenyltetramine tetrahydrochloride, 17.4 g. (0.38 mole) of formic acid and 38 ml. of 5 N hydrochloric acid was heated at reflux for 0.5 hour. The resulting reaction mixture was poured into a mixture of 55 ml. of concentrated ammonium hydroxide and ice, and the brown solid which formed was filtered off and dissolved in methanol. After filtering the methanol solution in order to clarify it, it was evaporated to dryness and the residue was ether washed. There was thus obtained 4.0 g. (80% theoretical yield) of the substantially pure 5,5'-bibenzimidazole, m.p. 265–7° C. and analyzing as follows:

Calcd. for $C_{14}H_{10}N_4$: C, 71.78%; H, 4.30%; N, 23.92%. Found: C, 71.60%; H, 4.18%; N, 23.67%.

Diimidazol-1-ylphenylphosphine oxide was prepared as follows:

To a stirred solution of 17.0 g. (0.25 mole) of imidazole in 400 ml. of tetrahydrofuran there was added a solution of 12.2 g. (0.063 mole) of phenylphosphonic dichloride in 75 ml. of tetrahydrofuran, over a 15-minute period and under nitrogen. The reaction was then stirred at gentle reflux for 3 hours. After cooling to room temperature, the solid imidazole hydrochloride which had formed as by-product was filtered off under nitrogen by means of a filter stick, and the product was obtained in tetrahydrofuran solution. Removal of the tetrahydrofuran by distillation and vacuum drying of the residual white solid gave the substantially pure diimidazol-1-ylphenylphosphine oxide, M.P. 98–100° C., giving by nuclear magnetic resonance analysis in dimethylformamide for $P^{31}$ a single peak at −6 p.p.m. with reference to 85% $H_3PO_4$.

5,5'-bibenzimidazole was converted to a polymeric phosphonamide by reacting it as follows with diimidazol-1-ylphenylphosphine oxide:

To a flask which was equipped with a tightly-fitted, Z-shaped condenser there were charged 3.36 g. (13.0 mM.) of diimidazol-1-ylphenylphosphine oxide and 3.05 g. (13.0 mM.) of 5,5'-bibenzimidazole. The system was pressurized with dry nitrogen to atmospheric pressure and the flask with its contents was placed in an oil bath which had been heated to 110° C. The temperature was gradually increased to 137° C. during the first 50 minutes, to 183° C. during about the subsequent 2 hours and to 228° C. during the following 40 minutes. At the end of this time the reaction mixture, initially solid, had been converted to a homogeneous, reddish-brown liquid. Slow evacuation for removal of by-product imidazole was then started, and a few minutes later heating of the oil bath was discontinued, although the flask and its contents were allowed to remain in the bath. Full oil-pump vacuum was applied, but about ten minutes later it was discontinued because the reaction mixture had set up to a solid foam. The flask was removed from the bath, and after cooling, the foam was crushed mechanically. The crushed product was then heated under vacuum for about 2 hours at 217–245° C. There was thus obtained as residue 4.83 g. of a substantially pure polymer consisting essentially of the repeating unit

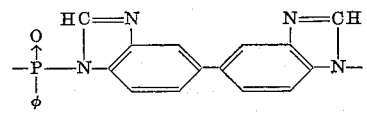

where φ denotes phenyl, said polymer analyzing 16.72% nitrogen and 8.35% phosphorus. From the condenser there was obtained 1.56 g. of imidazole. The total weight of the starting material was 6.41 g. and the total weight of imidazole plus polymeric product was 6.39 g.; the reaction thus occurred with substantially theoretical yield.

The polymer was found to have a melting range of 244° C. to 288° C. It began to decompose thermally at 360° C. At room temperature, the polymer was insoluble in toluene, 1,2-dimethoxyethane and 2-butanone and was soluble in 2-benzoylpyridine. Compression molding of the polymer at a temperature of ca. 200° C. gives well-dimensioned, smooth, molded objects possessing good mechanical strength and high resistance to heat and solvents.

EXAMPLE 2

A mixture consisting of 6.71 g. (0.026 mole) of diimidazol-1-ylphenylphosphine oxide and 6.09 g. (0.026 mole) of 5,5'-bibenzimidazole was heated for about 1.5 hours in a nitrogen atmosphere at a temperature which increased from 178° to 230° C., and then for about 0.5 hour at a temperature of 230° C. to 250° C. Slight vacuum was applied and the temperature was raised to 263° C. during about 20 minutes. Full vacuum was then applied and heating at 263° C. to 287° C. was conducted for about 5 hours. There was thus obtained as residue 10.30 g. of a brittle, dark-brown polymer which consisted essentially of the repeating unit

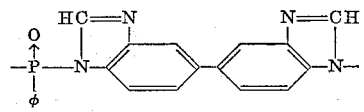

wherein φ denotes phenyl, said polymer analyzing 16.42% nitrogen and 7.93% phosphorus. From the trap which formed part of the reaction equipment, there was obtained 3.61 g. of imidazole.

Molding of the polymer in a high pressure, high temperature press gives coherent, molded pieces of good mechanical and thermal stability.

EXAMPLE 3

Pyrrol-1-ylpotassium (21 g., 0.20 mole) was suspended and partly dissolved in 400 ml. of 1,2-dimethoxyethane. To this, there was added, over a one hour period, a solution of 19.5 g. (0.10 mole) of phenylphosphonic dichloride in 100 ml. of 1,2-dimethoxyethane in an inert atmosphere and with ice-bath cooling. After all of the dichloride solution had been added, cooling was discontinued; and, although the reaction appeared to be complete, the reaction mixture was allowed to stand, with stirring at room temperature for 15 hours. The solids were removed by centrifuging and washed with 400 ml. of 1,2-dimethoxyethane. The combined washings and centrifuge liquor were distilled in vacuo to remove the 1,2-dimethoxyethane and yielded as residue 22.3 g. of a slightly violet solid. It was recrystallized three times from cyclohexane to give the substantially pure dipyrrol-1-ylphenylphosphine oxide, M.P. 107–8° C., and analyzing as follows:

Calcd. for $C_{14}H_{13}OP$: C, 65.62%; H, 5.11%; N, 10.94%; P, 12.09%. Found: C, 65.60%; H, 5.21%; N, 10.82%; P, 12.24%.

Nuclear magnetic resonance analysis, in 1,2-dimethoxyethane solution, gave a $P^{31}$ chemical shift at $-10.7$ p.p.m. with reference to 85% $H_3PO_4$. Proton nuclear magnetic resonance in $CDCl_3$ solution with tetramethylsilane as the internal standard gave the following chemical shifts: 7.8–8.4 p.p.m. (phenyl group), 7.15–7.45 p.p.m. ($\alpha$-hydrogens of the pyrrolyl groups), and 6.7–6.95 p.p.m. (pyrrolyl $\beta$-hydrogens). The integrated areas for these shifts have the ratio 10:8:8.

The infrared spectrum of the compound showed no absorption at 3400 cm.$^-$, the spectral region where absorption is attributable to N-H stretching in pyrrole. Hence, N-hydrogen had been replaced.

The dipyrrol-1-ylphenylphosphine oxide (5.12 g., 0.020 mole) and 5,5'-bibenzimidazole (4.68 g., 0.020 mole) were charged to a flask which was connected through a trap to a dry nitrogen by-pass line. The trap was cooled by immersion in liquid nitrogen. The flask maintained under a nitrogen pressure of one atmosphere, was immersed in a salt bath which had been heated to 108° C. The reaction temperature was increased to 208° C. within 42 minutes. At this point, formation of liquid condensate was observed. The temperature was raised to 308° C. within approximately the next two hours, during which period the formation of condensate continued and the reaction mixture was completely molten. Vacuum was then applied to effect complete removal of the by-product pyrrole and heating at a pressure of below 1 mm. Hg was continued for 6 hours at a temperature which decreased from 301° C. to 270° C. during this period. There was thus obtained as residue 7.15 g. of the dark-colored polymer which consisted essentially of the repeating unit

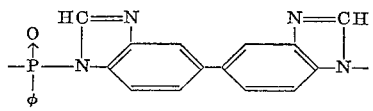

where $\phi$ denotes phenyl, said polymer analyzing 15.49% nitrogen and 7.96% phosphorus.

From the condenser there was obtained 2.09 g. of pyrrole.

A solution of the polymer in quinoline gives a tough, adherent coating when applied to copper sheeting and baked to dryness.

The above examples are given by way of illustration only, and the present invention is not to be considered as limited by them. It will be obvious to those skilled in the art that many modifications can be made within the spirit of the invention, which is limited only by the terms of the appended claims.

What we claim is:

1. The method of preparing a solid polymer which comprises heating, at a temperature of 100° to 400° C. a phosphorus compound of the formula

wherein Y is selected from the class consisting of the imidazol-1-yl and pyrrol-1-yl radicals and R is an aromatic hydrocarbon radical of from 6 to 12 carbon atoms which is free of olefinic and acetylenic unsaturation, and is linked through nuclear carbon to the remainder of the molecule with a compound of the formula

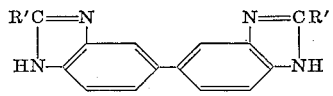

in which R' is selected from the class consisting of hydrogen and alkyl radicals of from 1 to 5 carbon atoms.

2. The method defined in claim 1, further limited in that Y is the imidazol-1-yl radical and R' is hydrogen.

3. The method defined in claim 1, further limited in that Y is pyrrol-1-yl and R' is hydrogen.

4. The method which comprises heating 5,5'-bibenzimidazole with a phosphate oxide of the formula

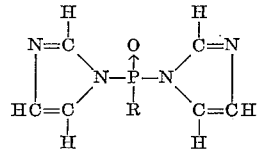

wherein R is an aromatic hydrocarbon radical of from 6 to 12 carbon atoms which is free of olefinic and acetylenic unsaturation, and is linked through nuclear carbon to the remainder of the molecule, at a temperature of 100° to 400° C., to obtain a solid polymer consisting essentially of the repeating unit

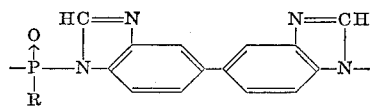

wherein R is as above defined.

5. The method of heating 5,5'-bibenzimidazole with a phosphine oxide of the formula

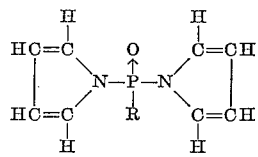

in which R is an aromatic hydrocarbon of from 6 to 12 carbon atoms which is free of olefinic and acetylenic unsaturation, and is linked through nuclear carbon to the remainder of the molecule, at a temperature of 100° to 400° C., to obtain a solid polymer consisting essentially of the repeating unit

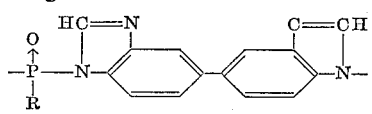

wherein R is as above defined.

6. The method of heating 5,5'-bibenzimidazole with diimidazol-1-ylphenylphosphine oxide at a temperature of 100° to 400° C., to obtain a solid polymer consisting essentially of the repeating unit

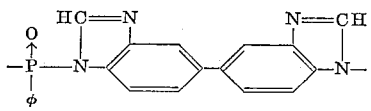

wherein $\phi$ denotes phenyl.

7. The method of heating 5,5'-bibenzimidazole with dipyrrol-1-ylphenylphosphine oxide, at a temperature of 100° C. to 400° C., to obtain a solid polymer consisting essentially of the repeating unit

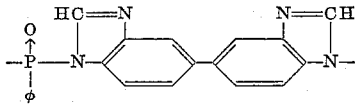

wherein φ denotes phenyl.

8. A compound of the formula

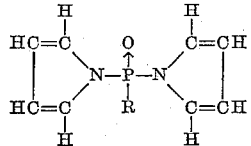

in which R is a benzenoid hydrocarbon radical of from 6 to 12 carbon atoms which is free of olefinic and acetylenic unsaturation and is linked through nuclear carbon to the remainder of the molecule.

9. Dipyrrol-1-ylphenylphosphine oxide.

References Cited by the Examiner

UNITED STATES PATENTS

| | | | |
|---|---|---|---|
| 3,137,692 | 6/1964 | Maier | 260—326.61 |
| 3,173,886 | 3/1965 | Greenley et al. | 260—2 |
| 3,227,728 | 1/1966 | Parts | 260—2 |

FOREIGN PATENTS 1,202,915   7/1959   France.

SAMUEL H. BLECH, *Primary Examiner*.

UNITED STATES PATENT OFFICE
CERTIFICATE OF CORRECTION

Patent No. 3,294,708                         December 27, 1966

Leo P. Parts et al.

It is hereby certified that error appears in the above numbered patent requiring correction and that the said Letters Patent should read as corrected below.

Column 8, lines 60 to 64, the formula should appear as shown below instead of as in the patent:

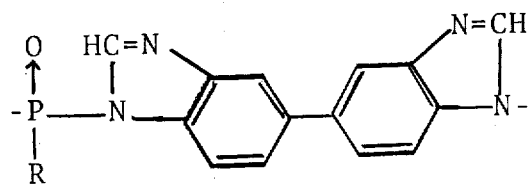

Signed and sealed this 9th day of January 1968.

(SEAL)
Attest:

EDWARD M. FLETCHER, JR.
Attesting Officer

EDWARD J. BRENNER
Commissioner of Patents